No. 680,849. Patented Aug. 20, 1901.
W. M. FARRAR.
APPARATUS FOR SUPPLYING COMPRESSED AIR TO MOVABLE MOTORS AND HOISTS.
(Application filed Sept. 12, 1900.)
(No Model.) 2 Sheets—Sheet 1.
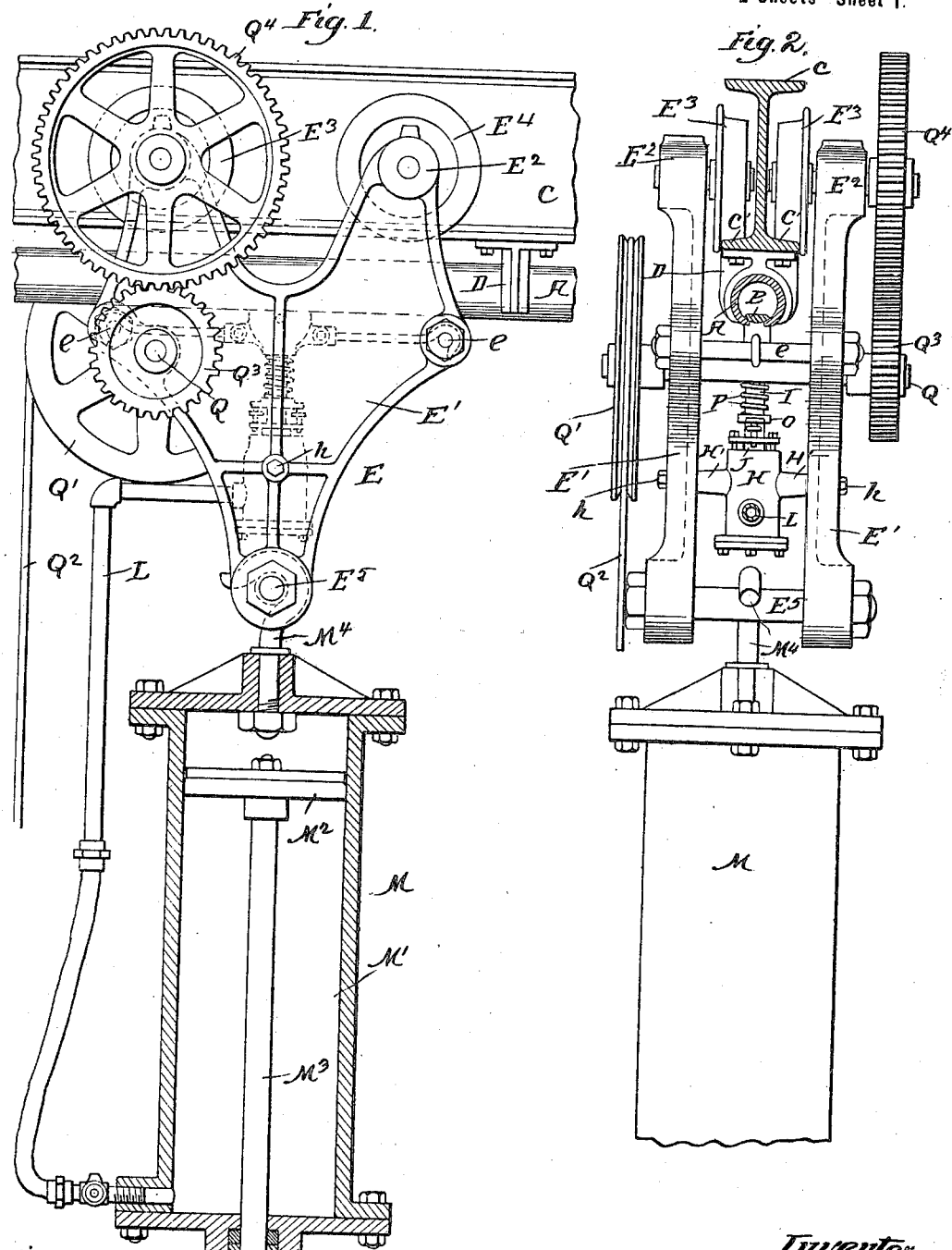
Witnesses:
H. B. Hallock.
L. W. Morrison.
Inventor,
William M. Farrar
by Geo. Hazelton
Atty.

No. 680,849. Patented Aug. 20, 1901.
W. M. FARRAR.
APPARATUS FOR SUPPLYING COMPRESSED AIR TO MOVABLE MOTORS AND HOISTS.
(Application filed Sept. 12, 1900.)
(No Model.) 2 Sheets—Sheet 2.
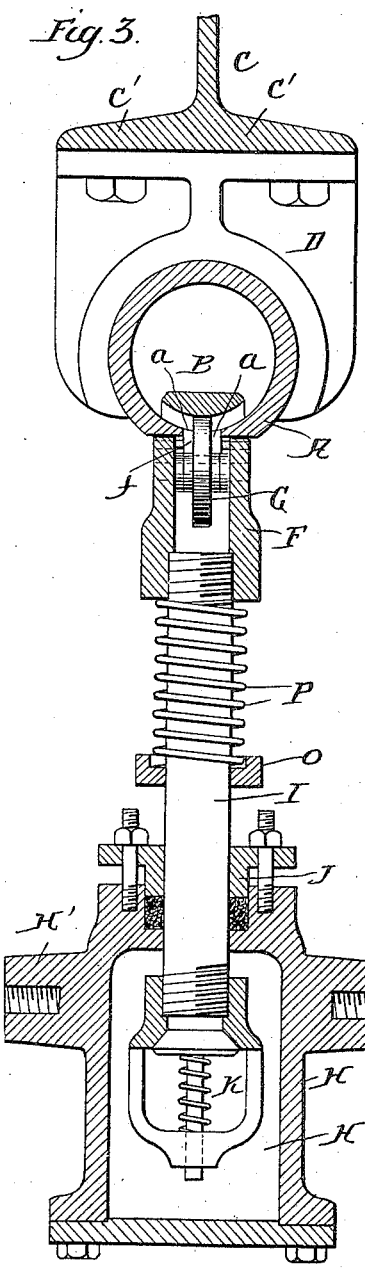
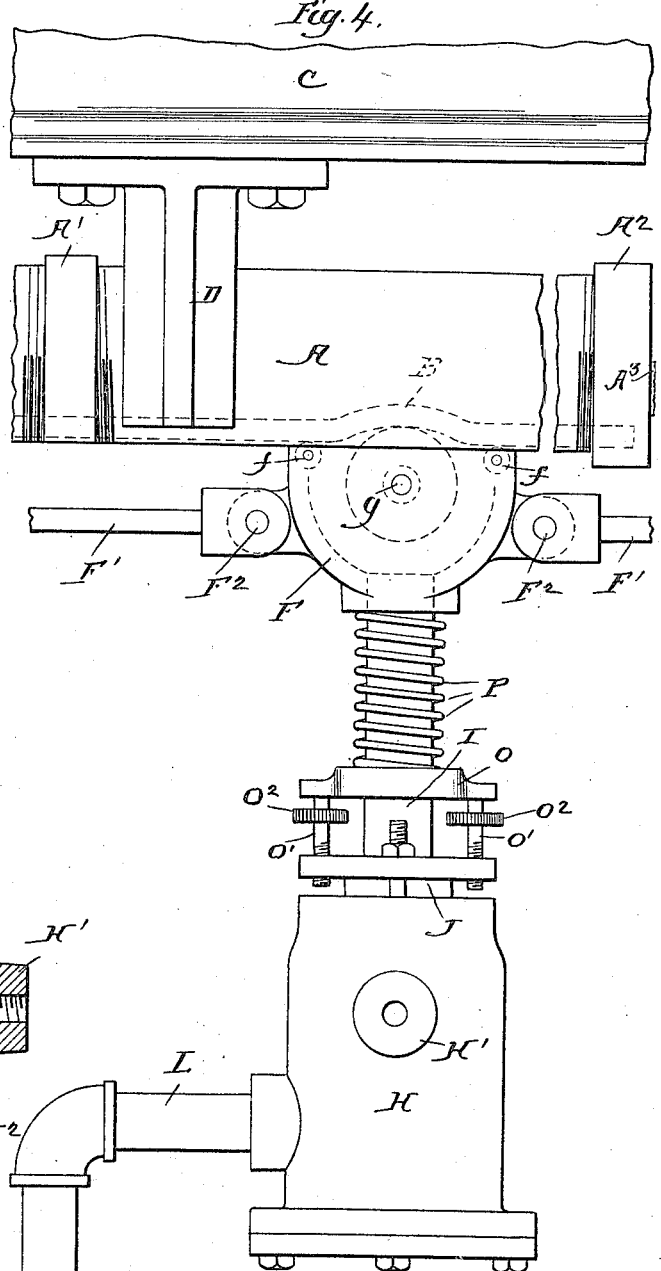
Witnesses:
H. B. Hallock.
L. H. Morrison.
Inventor:
William M. Farrar
by Geo. C. Hazelton
Atty.

UNITED STATES PATENT OFFICE.

WILLIAM M. FARRAR, OF HOBOKEN, NEW JERSEY.

APPARATUS FOR SUPPLYING COMPRESSED AIR TO MOVABLE MOTORS AND HOISTS.

SPECIFICATION forming part of Letters Patent No. 680,849, dated August 20, 1901.

Application filed September 12, 1900. Serial No. 29,771. (No model.)

*To all whom it may concern:*

Be it known that I, WILLIAM M. FARRAR, a citizen of the United States, residing at Hoboken, county of Hudson, and State of New Jersey, have invented a certain new and useful Improvement in Apparatus for Supplying Compressed Air to Movable Motors and Hoists, of which the following is a specification.

My invention relates to a new and useful improvement in methods of supplying compressed air to movable motors and hoists; and the object of my invention is to apply an induction device for the propulsion of cars, patented November 15, 1898, No. 614,095, by William M. Farrar, to all forms of moving air motors and hoists, particularly those used for lifting and conveying materials.

With this end in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side view of my apparatus, showing a portion of the track and conduit, the air-motor being in section. Fig. 2 is an end view of Fig. 1. Fig. 3 is an enlarged section of a portion of the track, the conduit, and induction device; and Fig. 4 is a side view of the same.

In carrying out my invention as here embodied, A represents the conduit or compressed-air main into which the compressed air is forced. This conduit consists of a number of steel tubes of nearly circular section, a slot $a$ being cut through the said conduit for its entire length. These conduits are coupled together by ordinary right and left thread pipe-couplings $A'$, these couplings being cut away wherever they interfere with the travel of the induction device. The extreme ends of these conduits are closed by caps or plugs $A^2$, through one of which a pipe $A^3$ will enter for conveying the compressed air within the conduit.

B is a strip of flexible material, which will extend the full length of the conduit and lie inside of the same and over the slot $a$, thus normally closing said slot and preventing the escape of the compressed air. The extreme end of this flexible strip will be fastened to the caps $A^2$.

C is a channel-iron or I-beam, which will extend the full length of the conduit and is arranged above the same. The lower flanges $C'$ of this channel-iron or I-beam furnish a track upon which the wheels of a carriage, which will be hereinafter described, will run. This track is arranged above the conduit A and is supported at frequent intervals by trusses or other means. This track C supports the conduit A by means of clips D, which are bolted to the under side of the track C and hanging down partially encircle the conduit A, and thus support the same.

E is the carriage, which consists of the two side castings $E'$. These side pieces $E'$ extend upward upon each side of the track C and have two bearings $E^2$ formed in the other upper portion, in which are journaled the traction-wheels $E^3$ and $E^4$ upon each side of the track, thus giving stability to the carriage by reason of its having four points of contact with the track C.

F is a box the upper end of which is open and is adapted to lie in close contact with the under side or flat face of the conduit A, the upper face of the two sides of the box coming in close contact with the under flat surface of the conduit A upon each side of the slot $a$. The ends of the box have projections which extend upward through the slot and come in close contact with the flexible valve-strip B. In Fig. 4 I have shown two small rollers $f$, which, if desirable, can be journaled in the box F and extend upward through the slot and come in close contact with the valve-strip B. These rollers taking the place of the projections upon the ends of the box F, as before described, would tend to reduce the friction upon the valve-strip B.

G is a roller which is journaled at $g$ in the sides of the box F. This roller G is of such diameter that its upper periphery will extend through the slot and a slight distance within the conduit A. Thus as the box F travels along beneath the conduit the roller G, coming in contact with the valve-strip B, will necessarily raise the valve-strip a distance from off its seat, which is the lower interior surface of the conduit A upon each side of the slot $a$, and the roller G being narrower in width than the slot $a$ the compressed air will be allowed to escape underneath the raised portion of the valve-strip B, down through the slot, around the roller G, and into the box F.

The box F is flexibly connected to the carriage by the links F', which are pivoted to the box F at the points $F^2$, the outer ends of these links being formed in the shape of hooks which are adapted to be hooked over the cross-bolts $e$, which extend between the two side pieces E' of the carriage. These links will tend to hold the box against any lateral displacement, but will allow a certain amount of vertical movement.

Located below the box F is a housing H. This housing H is secured to the carriage E by means of the bolts $h$, which pass through each of the side pieces E' of the carriage and are threaded into the lugs H' upon each side of the housing H.

I is a pipe the upper end of which is threaded into the box F and communicates with the interior thereof and extends downward and passes through the stuffing-box J, which is located in the upper end of the housing H and extends a slight distance within the chamber $H^2$, formed upon the interior of the housing H. A check-valve K is secured upon the lower end of this pipe I. Thus the compressed air has free passage through the box F and pipe I into the chamber $H^2$, the check-valve K preventing any retrograde movement of this compressed air.

A pipe L is tapped into the chamber $H^2$ and extends therefrom downward to the air-motor M. This air-motor may be of any construction or design, here illustrated as a simple hoist, M' being the cylinder, $M^2$ the piston, and $M^3$ the piston-rod, which passes downward through a suitable stuffing-box in the lower end of the cylinder and terminates in a hook upon which the material to be raised is secured. The motor M is attached to the carriage by means of the hook $M^4$, which hooks over a cross bolt or rod $E^5$, which extends across and connects the two lower ends of the side pieces E' of the carriage.

Above the stuffing-box J is a cross-head O, through the center of which the pipe I passes. This cross-head is supported by means of the screw-rods O', which are swiveled in the ends of the cross-head O and their lower ends being threaded through the gland of the stuffing-box J, milled wheels $O^2$ being secured upon these screw-rods for the purpose of rotating the same.

Interposed between the lower surface of the box F and the upper surface of the cross-head O and surrounding the pipe I is a spring P. The tension of this spring can be adjusted by either lowering or raising the cross-head by means of the screws O'. The purpose of this spring is to compensate for any irregularities in the track upon which the carriage travels and also tends to overcome the downward pressure exerted upon the wheel G by the compressed air in the conduit A.

The motive power of the carriage can be supplied in any manner, here designed to be operated by hand-power. A shaft Q is journaled in both of the side pieces E' and has upon one side a grooved wheel Q', over which the chain or cable $Q^2$ is designed to pass, so that the wheel Q' can be rotated from below in the well-known manner. Upon the opposite side of the carriage and secured to the shaft Q is a gear-wheel $Q^3$. This gear-wheel $Q^3$ meshes with a large gear-wheel $Q^4$, which is secured upon the same shaft as one of the traction-wheels $E^3$, and thus it will be seen that when the wheel Q' is rotated the carriage E' will travel in whichever direction desired.

The advantages of my invention are that this system of supplying air to moving motors obviates the inconvenience of the present method—that is, where the rubber hose is used to convey the compressed air. In the present method the rubber hose is suspended at intervals from carriages running on independent tracks, which not only increases the cost, but occupies much valuable space at the end of the runway nearest the supply, preventing the motor or hoist from covering the entire space. Loops or folds of hose also hang down and cause inconvenient obstructions. The rubber hose, moreover, rapidly deteriorates, causing expense and delay for repairs. My arrangement is entirely overhead, occupies very little space, and is practically a permanent construction, thus avoiding these difficulties and also permitting the motor or hoist to travel around curves and over switches and any number of times in one direction, which cannot be done with a flexible-hose arrangement. A further advantage of my invention is that all working parts are exposed and readily accessible, so that in the case of damage to any part it can be quickly exchanged or repaired.

Of course I do not wish to be limited to the exact details of construction here shown, as I wish to claim the broad idea of conveying air to moving motors from a continuous stationary conduit, and it is obvious that slight modifications could be made without materially departing from the spirit of my invention—as, for instance, the slot in the conduit need not necessarily be at the bottom thereof, but could be at any point on its circumference.

Having thus fully described my invention, what I claim as new and useful is—

1. In an apparatus for supplying compressed air to movable motors and hoists, the herein-described conduit consisting of slotted pipes of circular section coupled end to end so as to form a continuous air-tight main closed except for a slot running throughout its entire length and having its extreme ends closed by means of caps or plugs, a pipe entering through one of the caps or plugs for supplying air to the conduit, a flexible strip adapted to normally close the slot in the conduit, said strip being coterminal with the conduit and having its ends securely fastened to the caps or plugs at the extreme ends, substantially as and for the purpose specified.

2. In combination, an I-beam acting as a supporting-track, a pipe attached to the lower edge of the I-beam, said pipe having a slot, a carriage having wheels traveling on the I-beam, a box carrying a wheel projecting into the slot, a valve-strip normally closing the slot, lifted by the wheel, antifriction-wheels carried by the box, a pipe depending from the box, a chamber with which the pipe communicates, a suitable packing-ring for the pipe, for yielding and holding the wheel in the slot and for regulating the tension on the packing-ring, a motor supported by the carriage and means for supplying the fluid from the pipe to the motor.

3. In an apparatus for supplying compressed air to movable motors and hoists, in combination with a main of the character described, a track located above and adapted to support said main, a carriage adapted to be suspended from wheels running on said track, independent means for causing said carriage to travel along the track, a box flexibly connected with said carriage and adapted to travel in air-tight contact with said main, a housing located below said box and secured rigidly to said carriage, a stuffing-box located in the upper end of said housing, a tube secured to said box and passing through and adapted to reciprocate vertically in said stuffing-box, a chamber formed within the interior of said housing with which the lower end of said tube communicates, a check-valve secured upon the lower end of said tube within said chamber, spring-pressure adapted to be exerted against the lower surface of said box, means for adjusting the tension of said spring, a motor adapted to be suspended from the carriage, and pipes leading from the chamber within the said housing and communicating with the said motor for conveying the compressed air thereto, substantially as described and for the purpose specified.

In testimony whereof I have hereunto affixed my signature in the presence of two subscribing witnesses.

WILLIAM M. FARRAR.

Witnesses:
JOHN H. BECKER,
P. C. SPENCE.